United States Patent
Baumann

(10) Patent No.: US 6,674,606 B1
(45) Date of Patent: Jan. 6, 2004

(54) METHOD AND APPARATUS TO NORMALIZE THE ACCELERATION CONSTANT

(75) Inventor: Todd David Baumann, Berthoud, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 488 days.

(21) Appl. No.: 09/723,454

(22) Filed: Nov. 27, 2000

Related U.S. Application Data
(60) Provisional application No. 60/198,998, filed on Apr. 21, 2000.

(51) Int. Cl.$^7$ .................................................. G11B 5/596
(52) U.S. Cl. .................................. 360/78.07; 360/78.06
(58) Field of Search .......................... 360/78.01, 78.04, 360/78.06, 78.07, 78.09, 78.14

(56) References Cited

U.S. PATENT DOCUMENTS

| | | | | |
|---|---|---|---|---|
| 4,835,633 A | * | 5/1989 | Edel et al. ................ | 360/78.12 |
| 5,122,718 A | | 6/1992 | Sawata ...................... | 318/621 |
| 5,159,254 A | | 10/1992 | Teshima ..................... | 318/611 |
| 5,305,160 A | | 4/1994 | Funches et al. .......... | 360/78.07 |
| 5,343,131 A | | 8/1994 | Baumann .................. | 318/561 |
| 5,369,345 A | | 11/1994 | Phan et al. ................ | 318/561 |
| 5,473,550 A | | 12/1995 | Cameron et al. ......... | 364/571.01 |
| 5,566,095 A | | 10/1996 | Cameron et al. ......... | 364/571.01 |
| 5,680,270 A | | 10/1997 | Nakamura ................ | 360/77.04 |
| 5,781,365 A | | 7/1998 | Romano et al. .......... | 360/78.06 |
| 5,828,515 A | | 10/1998 | Kim .......................... | 360/78.06 |
| 5,835,302 A | * | 11/1998 | Funches et al. .......... | 360/78.07 |
| 5,912,782 A | | 6/1999 | Lee et al. .................. | 360/78.09 |
| 5,914,829 A | | 6/1999 | Kadlec et al. ............ | 360/78.04 |
| 5,917,672 A | | 6/1999 | Pham et al. ............... | 360/78.09 |
| 6,031,684 A | | 2/2000 | Gregg ....................... | 360/78.06 |

\* cited by examiner

*Primary Examiner*—David Hudspeth
*Assistant Examiner*—Jason Olson
(74) *Attorney, Agent, or Firm*—David K. Lucente; Derek J. Berger

(57) ABSTRACT

A method and apparatus for normalizing the acceleration constant used by a servo control system in a disc drive are disclosed. The method and apparatus involve performing a test seek and summing the position error measured at sample periods during the deceleration phase of the test seek. A correction factor applied to the acceleration constant is adjusted if the sum of the position errors differs from the sum of position errors measured from a nominal seek. Adjusting the correction factor to cause a position error sum that is close or equal to the sum from the nominal seek provides a relatively symmetrical seek arrival without additional correction factor offsets or gain variances.

20 Claims, 3 Drawing Sheets

METHOD AND APPARATUS TO NORMALIZE THE ACCELERATION CONSTANT

RELATED APPLICATIONS

This application claims priority of U.S. provisional application Ser. No. 60/198,998, filed on Apr. 21, 2000.

FIELD OF THE INVENTION

This application relates generally to actuator servo control for disc drives and more particularly to normalizing the acceleration constant utilized by the servo control.

BACKGROUND OF THE INVENTION

Disc drives store data on media and then read the data from the media when it is needed by the host computer. The data is contained in tracks on the media, and a read/write head is placed over the appropriate track by an actuator arm connected to a servo motor. An analog current signal is applied to the servo motor to move the actuator. The current applied to the servo must be precisely controlled to accurately guide the actuator and head to the appropriate track. The movement of the actuator and head from one track to another is known as a seek. It is generally desirable to reduce the seek time to a minimum.

A servo control system is included in the disc drive electronics to properly control the amount of current applied to the servo motor. A seeking profile is stored by the disc drive for each potential seek. The seeking profile is a function of the target velocity for the head for a given distance remaining to the desired track. The distance to the desired track at any given time in the seek is known as the position error. The seeking profile has an acceleration portion in which the actuator is accelerated from zero to its maximum velocity for the seek and a deceleration portion in which the actuator is decelerated from its maximum velocity for the seek back to zero. The seek profile places the read/write head over the desired track (i.e., zero position error) once the velocity has been reduced to zero.

The control system provides current to the servo motor by referencing the actual head position and the actual head velocity in relation to the seeking profile. The control system adjusts the amount of current applied by determining whether the actual head velocity is equal to the desired velocity stored in the seek profile for the current position error. To create a proper seek profile and determine the amount of current to be applied to the servo motor during the seek, the characteristics of the servo motor must be considered. An estimator, which is a model of the servo system, is included in the control system to predict the servo system's response to commands intended to move the actuator as desired during the seek. The input command is converted to an analog current signal that drives the servo motor. The estimator has shortcomings because the gain variation of the servo motor may change over time due to aging and temperature and the estimator may become inaccurate due to that variation.

To cause the servo motor to behave like the estimator model and therefore, respond to the command as predicted, a correction factor is multiplied against the command used to drive the motor to cause the acceleration constant of the actual servo to match the acceleration constant of the estimator model. Alternatively, a correction factor may be multiplied by the estimator model to cause its response to match the actual servo. Several conventional methods of calculating the acceleration constant have been used.

However, the correction factor determined by these conventional methods causes the seek arrival to be asymmetric. A seek from one track to another in one direction results in an undershoot of the desired position while a seek between those tracks in the opposite direction results in an overshoot. Undershooting or overshooting the desired position requires additional time beyond that allotted in the seek profile for the head to settle over the desired position. This additional time is not desirable because it reduces the disc drive's performance. Thus, the correction factor is not adequate, and arbitrary offsets must be added or control gains must be varied to attempt cancellation of the asymmetric seek behavior, thereby overly complicating the control system.

Accordingly there is a need for a method and apparatus that normalizes the acceleration constant of the servo motor or the estimator model so that each behaves similarly yet the servo motor does not behave asymmetrically without additional offsets and/or gain variances.

SUMMARY OF THE INVENTION

Against this backdrop the present invention has been developed. The present invention is a method and disc drive apparatus that normalizes the acceleration constant of the servo motor or estimator model by calculating a correction factor. The correction factor is computed by summing the position error of an actual seek from one track to another measured during the deceleration phase. That sum is then compared to the sum of position errors of a nominal (i.e., desired) seek for the same tracks measured during the deceleration phase.

The method disclosed is for normalizing an acceleration constant of an electromechanical control system of a disc drive by adjusting a correction factor implemented by the control system. The method involves measuring a test seek position error at each of several predetermined intervals during a deceleration phase of a test seek. The test seek position errors are arithmetically combined to obtain a test seek value. The correction factor is adjusted if the test seek value differs from a nominal seek value and otherwise is not generally adjusted.

The disc drive is configured to perform the method. The disc drive has at least one head having a controllable position. The head is configured to perform the measuring step of the method. The disc drive also has a processor configured to receive position errors from the head. The processor performs the combining step of the method and compares the test seek value to the nominal seek value. The processor also updates the correction factor in accordance with adjusting step of the method. The disc drive also has a servo control configured to implement the correction factor.

These and various other features as well as advantages which characterize the present invention will be apparent from a reading of the following detailed description and a review of the associated drawings.

DETAILED DESCRIPTION

Figure 1:
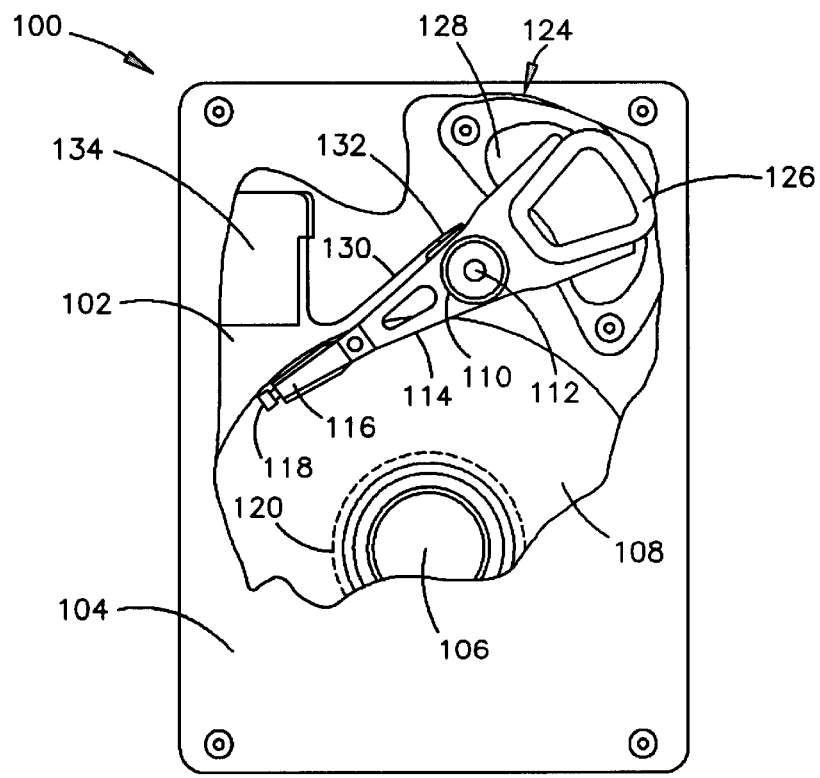
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
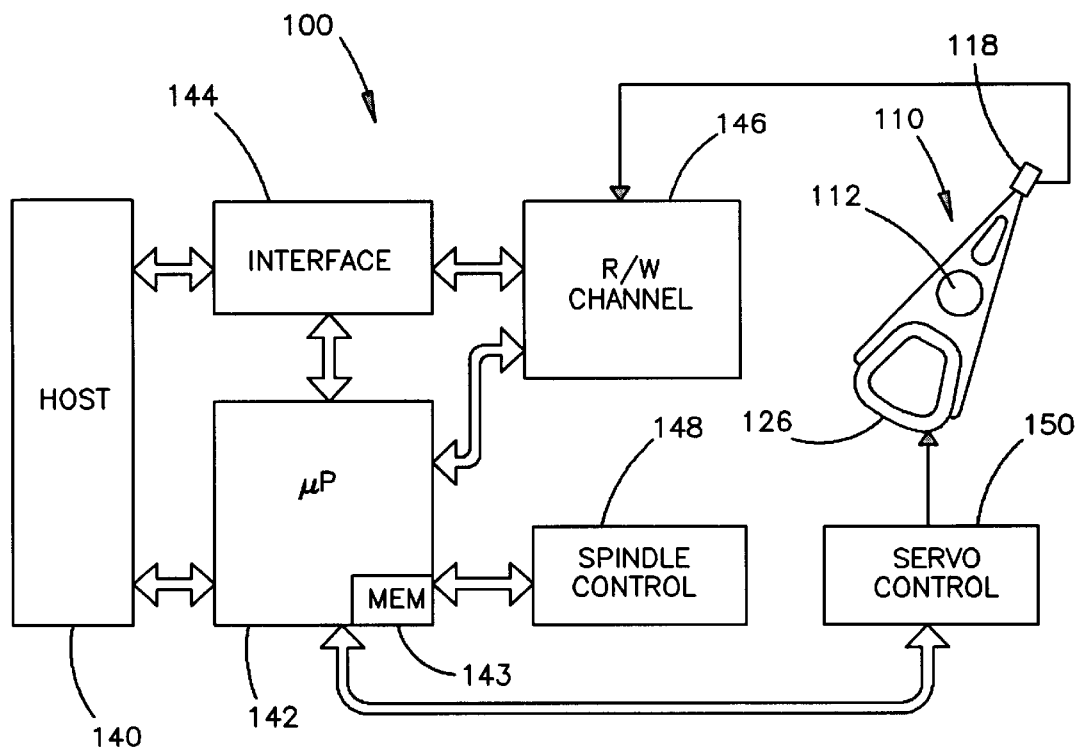
FIG. 2 is a diagram of the disc drive electronics and actuator arm.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor 126, thereby causing the actuator assembly 110 to be pivoted.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

Figure 3:
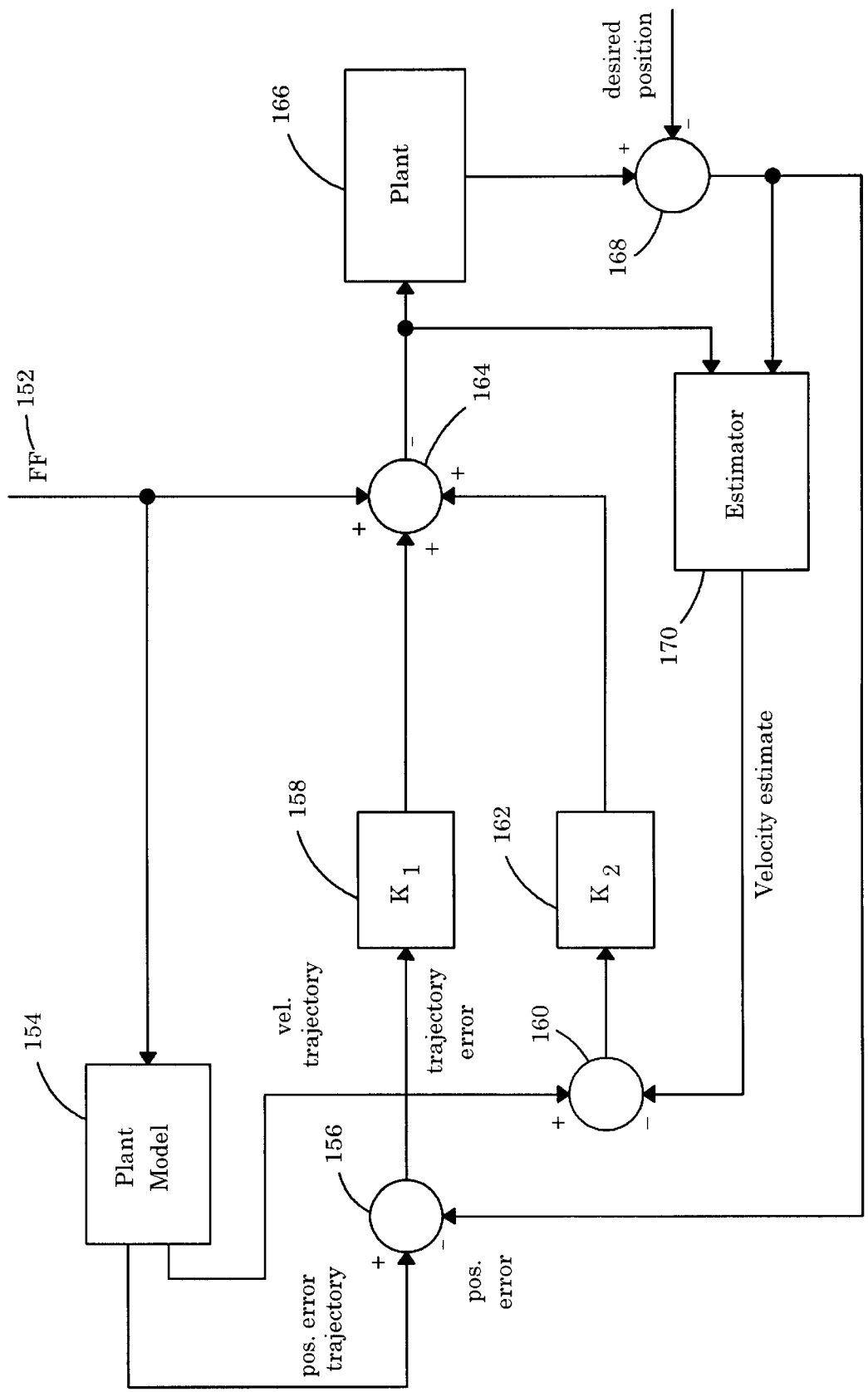
FIG. 3 is a diagram of a model reference seek controller in accordance with a preferred embodiment of the present invention.

FIG. 3 illustrates a model reference (MR) seek control system utilized by a preferred embodiment of the present invention. An MR seek control system as shown is a model of the seek control typically used on relatively short duration seeks, such as from one track to an adjacent track, but could be used for any seek length. The MR control system receives a feedforward signal 152 from the disc drive processor that is used to initiate and maintain a desired seek. The feedforward signal is provided to a plant model 154 and a summing node 164. The plant model 154 responds to the feedforward command by producing a desired position error and target velocity for the current point in the seek. The plant model 154 outputs the desired position error trajectory to summing node 156 and the target velocity is fed to summing node 160.

The summing node 156 also receives a position error signal that represents the actual position error of the head measured at the latest sample. Summing node 156 outputs the difference between the desired position error generated by the plant model 154 and the actual position error output by summing node 168. The summing node 156 outputs a trajectory error to scalar operation 158 which multiplies a scaling constant $K_1$ by the trajectory error to produce a position error command signal to correct for the difference in position. The position error command signal is then fed to summing node 164.

The summing node 160 receives a velocity estimate of the servo system provided by estimator model 170 in addition to the target velocity from plant model 154. The velocity estimate indicates the estimated velocity of the actual servo motor produced in response to the latest digital drive command received by the plant 166. Summing node 160 outputs the difference between the velocity estimate and the target velocity to scalar operation 162. Scalar operation 162 multiplies a second scaling constant $K_2$ by the velocity error to produce a velocity error command signal.

Summing node 164 receives the position error command and the velocity error command in addition to the feedforward signal 152. A drive command is output by the summing node 164 to the plant 166 that is the summation of the feedforward signal, the position error signal, and the velocity error signal. The plant 166 represents several operations and associated components. These may include an acceleration constant operation employed by the disc drive processor that scales the digital command by the correction factor. Alternatively, this acceleration constant operation may be included in the estimator model 170. The plant 166 also includes a digital to analog converter (DAC) that receives the scaled drive command output by the disc drive processor and outputs an analog drive current. The plant 166 also includes an amplifier that magnifies the analog current to a level suitable to drive the servo motor and actuator assembly also included in the plant 166. The actuator assembly moves in relation to the drive current and reads/outputs the actual position of the head.

The actual position of the head is output to summing node 168. A desired position signal provided from the disc drive processor is also fed to the summing node 168. The output, or actual position error, is the difference between the desired position (i.e., target track) and the actual position. This position error signal is provided to the estimator 170 and the summing node 156, as previously mentioned.

During the preferred acceleration constant normalization process embodiment, the above-mentioned control system is employed to perform repeated MR seeks. During the MR seeks, the disc drive processor sums the deceleration phase position errors and compares the measured sum to a stored position error nominal sum taken from the deceleration phase of a nominal (i.e., ideal) seek position error profile. The correction factor is adjusted by the processor as the seeks continue when the sums differ.

The nominal seek position error profile may be produced empirically by manually adjusting the correction factor until the actual seek becomes ideal for an empirical test. Once this empirical test is done on a disc drive, the nominal sum taken from this profile may be used for calibration of all other disc drives having the same characteristics such as the track density and the control system. Alternatively, the nominal seek position error profile and corresponding nominal sum may be computed analytically for a drive having those characteristics and be used in the calibration for all other drives of those characteristics.

The correction factor that results from the calibration process provides an acceleration constant that allows the actual plant 166 to behave like the model plant 154. Relatively symmetric seek arrivals result without the use of additional offsets or gain variances.

Figure 4:
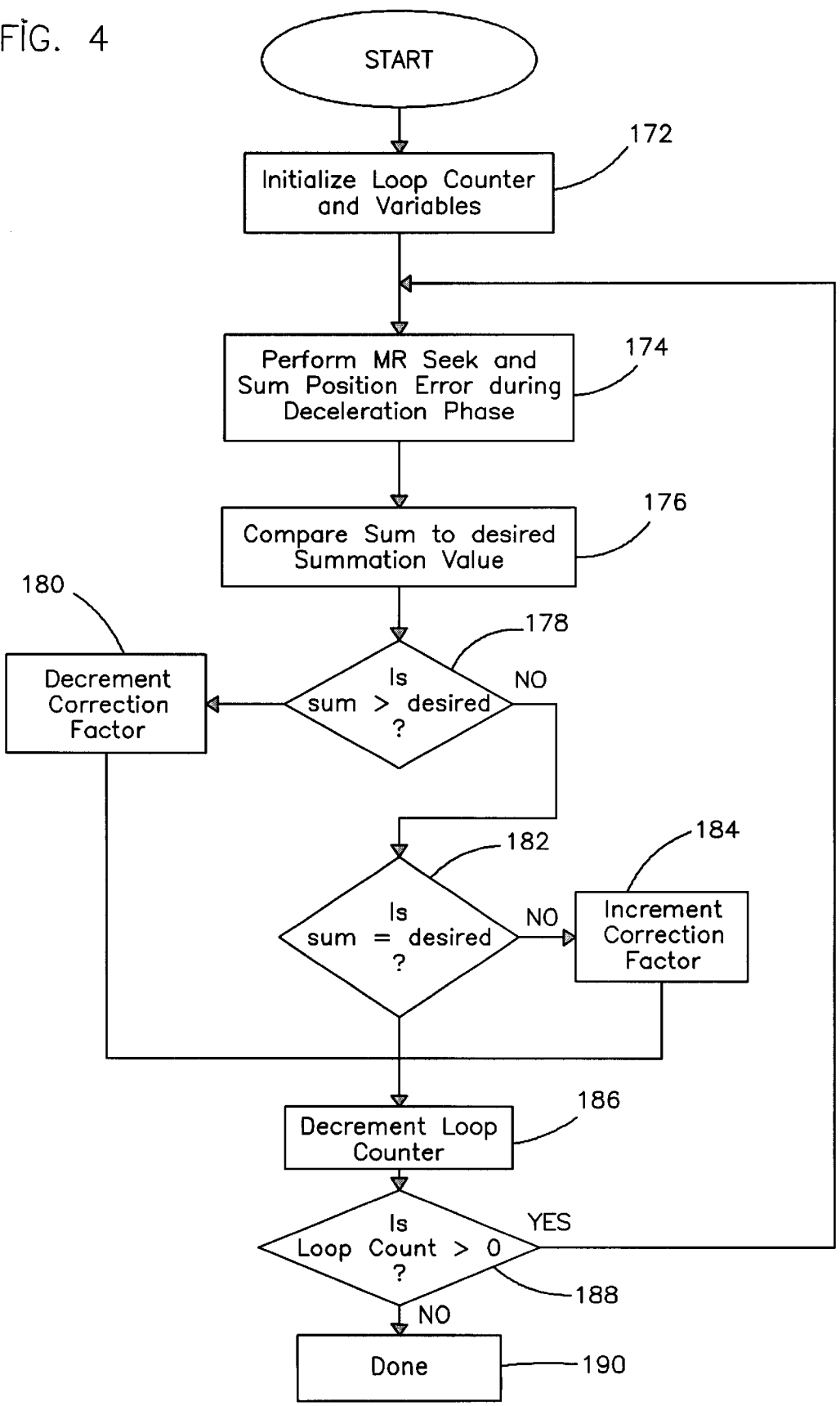
FIG. 4 is a flow chart of the correction factor calibration subroutine in accordance with a preferred embodiment of the present invention.

FIG. 4 illustrates the operational flow of an embodiment of the present invention. The normalization process, typically implemented during the certification process for the disc drive, begins at Variable operation 172. At this operation, the loop counter is set to the desired value and the variables of the control system including $K_1$, $K_2$, and an initial acceleration constant correction factor are loaded from memory for performing the MR seek. At seek operation 174, the MR seek is performed by providing a feedforward command and a desired position (i.e. target track) to the MR control system. During seek operation 174, the processor samples the position error at various time during the deceleration phase, such as each time the head reads a new position, and sums the position error from those samples.

Once the seek is complete, Compare operation 176 weighs the calculated sum against the sum stored for the nominal seek position error profile for the same beginning and ending track used in the MR seek. Query operation 178 then detects whether the calculated sum of the position errors is greater than the sum of position errors for the nominal seek position error profile. If so, then Adjust operation 180 decrements the correction factor. Alternatively, the control system could be configured so that an increment of the correction factor is the proper adjustment when the measured sum is greater than the nominal sum. Then, control moves to Counter operation 186 where the loop counter is decremented.

If the sum for the actual seek is not greater than the nominal sum obtained from the nominal seek position error profile, then query operation 182 tests whether the sum for the actual seek is equal to the nominal sum. If the sum is equal to the nominal sum, then control passes directly to loop operation 186 without altering the correction factor. In an alternative embodiment, the normalization process may terminate once the sum for the actual seek equals the nominal sum.

In the embodiment shown, once Query operation 182 detects that the calculated sum is not equal to the desired or nominal sum, it is known that the calculated sum is less than the nominal sum and Adjust operation 184 increments the correction factor. Alternatively, the control system could be configured so that an increment of the correction factor is the proper adjustment when the measured sum is greater than the nominal sum. Then control passes to Counter operation 186 where the loop counter is decremented.

Once control has been passed to the Counter operation 186 from the various operations and the loop counter has been decremented, Query operation 188 tests whether the loop counter is greater then zero. If not, then control passes to Exit operation 190 where the normalization process terminates. If the loop counter is greater than zero, then control returns to Seek operation 174 and the normalization process continues.

When the normalization process ends, the correction factor's current value produces a deceleration position error sum that is equal to the deceleration position error sum from the nominal seek position error profile or is a relatively close approximation. The correction factor that results from the normalization process establishes an acceleration constant closely matching that of the plant model and provides relatively symmetrical seek arrivals. The correction factor is typically stored on the storage media of the disc drive for use during operation initialization or it may be stored in non-volatile memory.

Furthermore, the normalization process may be employed once, such as during the certification process by overlaying the necessary programming in the disc drive buffer or it may be employed during each operational start-up process to account for the current operating conditions and aging of the disc drive. The process may also be employed periodically during idle periods of operation. Another alterative involves storing a different correction factor for each potential seek by performing a normalization process for each potential seek rather than using one reference seek to provide a universal correction factor. Embodiments of the present invention may be employed in software, analog and/or digital hardware, or firmware.

In conclusion, an exemplary method for normalizing an acceleration constant of an electromechanical control system of a disc drive involves adjusting a correction factor implemented by the control system. The method includes measuring a test seek position error at each of several predetermined intervals during a deceleration phase of a test seek, such as by operation 174. The test seek position errors are arithmetically combined to obtain a test seek value, such as by operation 176. The correction factor is adjusted if the test seek value differs from a nominal seek value, such as by operations 180 and 184, and otherwise is not generally adjusted.

An exemplary disc drive is configured to perform the exemplary method noted above. The disc drive has at least one head 118 having a controllable position. The head 118 is configured to perform the measuring step of the method. The disc drive also has a processor 142 configured to receive position errors from the head 118. The processor 142 performs the combining step of the method and compares the test seek value to the nominal seek value. The processor 142 also updates the correction factor in accordance with adjusting step of the method. The disc drive also has a servo control 150 configured to implement the correction factor.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, other servo control system designs may be implemented. Also, during the normalization process, the adjustment provided to the correction factor may be incremental or may be based on the degree to which the actual sum differs from the nominal sum. Additionally, the normalization process may involve seeking in one direction during some of the seeks and seeking in the opposite direction during other seeks or it may involve only seeking in one direction for each test seek. Numerous other changes may be made which will readily suggest themselves to those skilled in the art and which are encompassed in the spirit of the invention disclosed and as defined in the appended claims.

What is claimed is:

1. A method for normalizing an acceleration constant of an electromechanical control system by adjusting a correction factor implemented by the control system, comprising steps of:
   a) measuring a test seek position error at each of several predetermined intervals during a deceleration phase of a test seek;
   b) arithmetically combining the test seek position errors to obtain a test seek value;
   c) adjusting the correction factor if the test seek value differs from a nominal seek value and otherwise not generally adjusting the correction factor.

2. The method of claim 1, wherein the adjusting step c) comprises steps of:
   c)(1) incrementing the correction factor when the test seek value is less than the nominal seek value; and
   c)(2) decrementing the correction factor when the test seek value is more than the nominal seek value.

3. The method of claim 1, further comprising a step of d) repeating measuring step a), combining step b), and adjusting step c) until the test seek value equals the nominal seek value.

4. The method of claim 1, further comprising a step of e) repeating measuring step a), combining step b), and adjusting step c) for a predetermined number of times.

5. The method of claim 1, wherein the predetermined intervals are defined by servo samples periods.

6. The method of claim 1, further comprising a step of f) repeating measuring step a) in an opposite direction and then repeating combining step b), and adjusting step c) to further adjust the correction factor.

7. The method of claim 1, further comprising a step of g) storing the correction factor on the storage media.

8. The method of claim 1, wherein measuring step a), combining step b), and adjusting step c) are repeated during each disc drive start-up.

9. The method of claim 1, further comprising steps of:
   h) measuring a nominal seek position error at each of several predetermined intervals during a deceleration phase of a nominal seek; and
   i) arithmetically combining the nominal seek position errors to obtain the nominal seek value.

10. The method of claim 1, wherein the correction factor is applied to an estimator model.

11. A disc drive configured to perform the method of claim 1, comprising:
    at least one head having a controllable position, the head configured to perform the measuring step a);
    a processor configured to receive position errors from the head, to perform the combining step b), to compare the test seek value to the nominal seek value, and to update the correction factor in accordance with adjusting step c); and
    a servo control configured to implement the correction factor.

12. The disc drive of claim 11, wherein the processor is further configured to increment the correction factor when the test seek value is less than the nominal seek value and decrement the correction factor when the test seek value is more than the nominal seek value.

13. The disk drive of claim 11, wherein the processor is further configured to repeatedly perform combining step b), and compare the test seek value to the nominal seek value, and to update the correction factor in accordance with adjusting step c) until the test seek value equals the nominal seek value.

14. The disc drive of claim 11, wherein the processor is further configured to repeatedly perform combining step b), and compare the test seek value to the nominal seek value, and to update the correction factor in accordance with adjusting step c) for a predetermined number of times.

15. The disc drive of claim 11, wherein the predetermined intervals are defined by servo sample periods.

16. The disc drive of claim 11, wherein the head is further configured to repeatedly perform measuring step a) for test seeks such that each successive test seek is in an opposite direction to the preceding seek; and wherein the processor is further configured to repeatedly perform combining step b), and compare the test seek value to the nominal seek value, and to update the correction factor in accordance with adjusting step c) until the test seek value equals the nominal seek value.

17. The disc drive of claim 11, further comprising a storage media and wherein the correction factor is stored on the storage media.

18. The disc drive of claim 11, wherein the processor is further configured to repeatedly perform combining step b), and compare the test seek value to the nominal seek value, and to update the correction factor in accordance with adjusting step c) until the test seek value equals the nominal seek value during each disc drive start-up.

19. The disc drive of claim 11, wherein the processor is further configured to adjust the correction factor by an amount related to a degree of difference between the test seek value and the nominal seek value.

20. An actuator controller for a data storage device comprising:
    a servo control system; and
    a calibration means for normalizing an acceleration constant of the servo control system.

* * * * *